June 9, 1964     L. A. WIKKERINK     3,136,833
METHOD OF MAKING MAT TYPE FLOOR SWITCHES
Original Filed Nov. 26, 1957
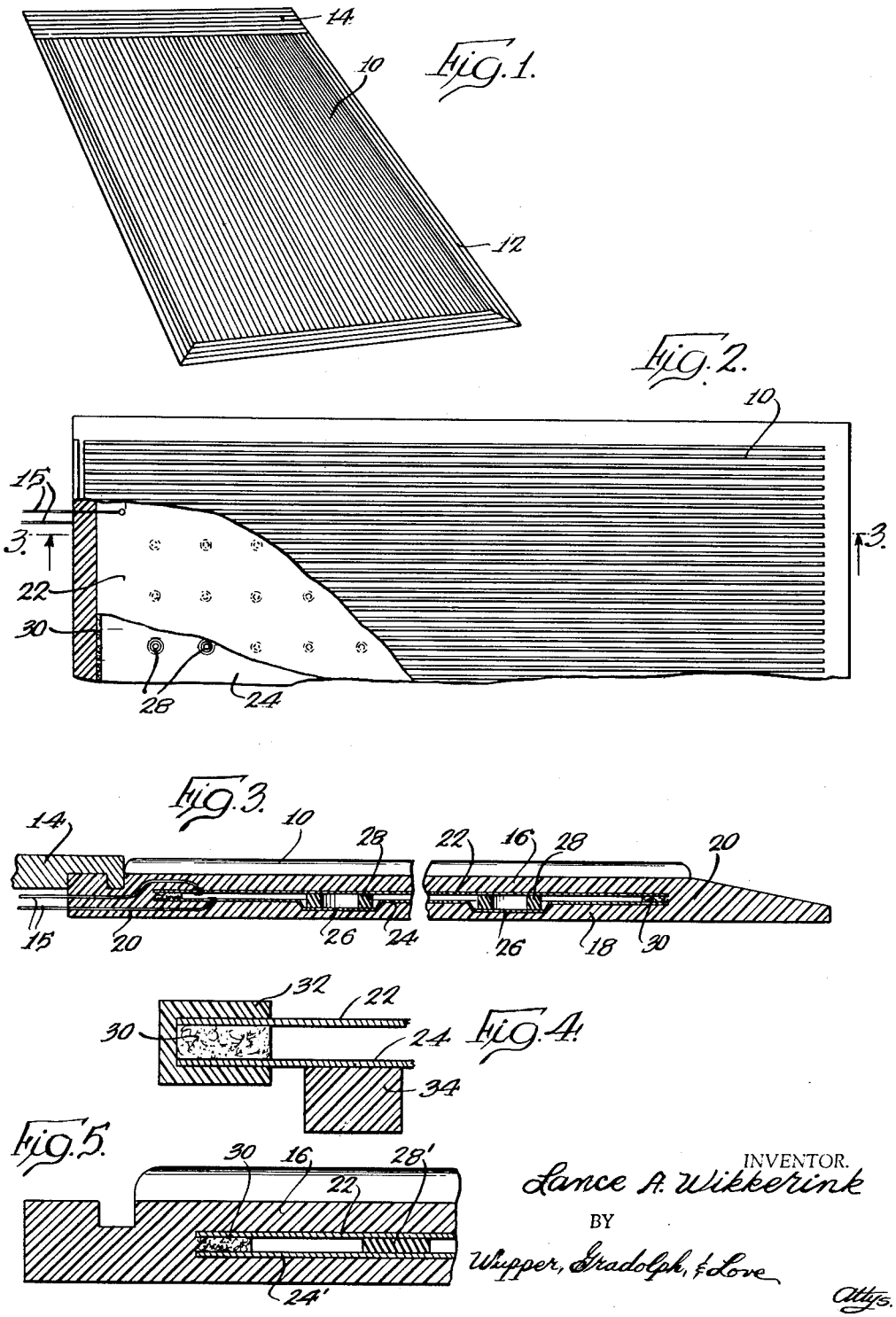
INVENTOR.
Lance A. Wikkerink
BY
Wupper, Gradolph, & Love
Attys.

United States Patent Office 3,136,833
Patented June 9, 1964

1

3,136,833
METHOD OF MAKING MAT TYPE
FLOOR SWITCHES
Lance A. Wikkerink, Milwaukee, Wis., assignor to Republic Industries, Inc., Chicago, Ill., a corporation of Illinois
Original application Nov. 26, 1957, Ser. No. 699,076, now Patent No. 2,954,446, dated Sept. 27, 1960. Divided and this application Dec. 2, 1959, Ser. No. 856,718
3 Claims. (Cl. 264—277)

The present invention relates to molded mat type floor switches and is a division of application Serial No. 699,076, filed November 26, 1957, now U.S. Patent No. 2,954,446.

Mat switches as contemplated by this invention are used for controlling the operation of such devices as public building automatic door openers, for instance. They have much the appearance of a pliable floor mat, and the molded resilient portion is usually formed of some pliable resin, such as a polyvinyl resin for instance.

In general, they consist of a bottom molded layer which is supported by the floor and a top molded layer separated therefrom excepting that the layers are joined at their edges. These two resilient layers enclose a pair of metal sheets (aluminum is satisfactory) spaced slightly apart by a plurality of soft rubber buttons or the like. The two metal plates act as the contacts of an electric switch, and are held away from each other until someone steps upon the mat, whereupon the two metal plates are pressed together locally so as to complete an electrical circuit. This in turn, in any suitable fashion, controls the operation of an automatic door actuator.

One of the problems associated with such mats is that in order to facilitate construction, and particularly to prevent water from seeping into the interior, the top and bottom layers and the surrounding edge of the mat are molded in one operation so as to avoid the necessity for cemented seams. Although this molding operation is ordinarily conducted at low pressure, the polyvinyl resin, for instance, will, with any prior used sealing means I know of, flow inwardly between the aluminum sheets at the spaced edges in an unpredictable fashion so that certain regions of the sheets become permanently insulated from each other. These areas of the mat therefore become insensitive to the weight of a person stepping thereon. For this reason, there is a considerable scrap loss in mats so produced.

Mats manufactured from precast cemented elements are even less satisfactory and therefore the practice has been to cast mats complete in one operation and to accept the scrap loss as inevitable.

It is the principal object of my invention to provide an improved method for making a mat type floor switch of novel construction such that, although the top, bottom, and surrounding edge portion of the mat are cast as a single element so that no cemented seams are used, no seepage of the fluid plastics material takes place between the plates at their edges in such fashion as to insulate certain regions of the plates from each other.

An additional object is to accomplish the above in such fashion that although the fluid polyvinyl or other resin does not leak inwardly between the plates in an uncontrollable fashion, it nevertheless does enter sufficiently just at the edges to hermetically seal the plates to each other and to provide sufficient support and stiffness to prevent the possibility of the plates shifting relative to each other.

Still another object is to provide a method of making an improved mat type floor switch comprised of resilient top, bottom, and edge members enclosing a pair of separated contact plates in which the plates are firmly bonded to the resilient material at their edges as well as over their major external surface portions.

Yet another object is to provide a novel method for accomplishing the above in a simple and straightforward fashion and at relatively low cost, and such that there are substantially no unsatisfactory finished mats produced which need to be rejected.

Other objects and advantages will become apparent from the following description of a preferred embodiment of my invention which is illustrated in the accompanying drawings.

In the drawings, in which similar characters of reference refer to similar parts throughout the several views, FIG. 1 is a perspective view from above of a mat type floor switch produced according to the teachings of the present invention;

FIG. 2 is a top view of a portion of the mat shown in FIG. 1, with the various layers thereof revealed by breaking away portions of the mat structure;

FIG. 3 may be considered as a vertical longitudinal sectional view taken in the direction of the arrows substantially along the line 3—3 of FIG. 2;

FIG. 4 is an enlarged sectional view of a sub-assembly portion and may be considered as being essentially a detail taken from FIG. 3; and FIG. 5 is a sectional view similar to FIG. 3, but showing a minor variation in the construction.

Referring to FIG. 1 of the drawings, the mat there shown may be considered as being representative of the type of article which forms the subject matter of the present invention. Such mats are typically of the order of 45 inches long by 28 inches wide, although dimensions will vary according to preference. The main resilient mat portion is indicated by the numeral 10, this central area being usually surrounded by an extruded metal trim strip 12 which has a somewhat wider member 14 at the threshold end interlocking with the resilient portion, as shown in FIG. 3. This threshold is anchored to the floor so as to retain the mat against shifting. The electrical leads 15 riveted to the contact plates also enter the mat at this end so as to be out of the way and protected by the plate 14. Beneath the plate 14 they may turn downwardly and pass through the floor if desired. Since the metal trim forms no portion of the present invention, it is shown in FIG. 1 only, excepting for the illustration of the previously mentioned interlocking feature in FIG. 3.

The top 16 and bottom 18 layers of the resilient polyvinyl material are joined at their side and end edges 20 by the same material molded integrally therewith, all during one molding operation. The resilient members of the mat enclose a pair of spaced aluminum plates, the top plate being indicated by the numeral 22 and its bottom counterpart by the numeral 24.

As shown in FIG. 3, the bottom plate 24 is indented locally from the top so as to form shallow circular recesses 26 at spaced intervals thereover, and each of these recesses contains a soft rubber ring 28 that extends above the top of its recess about 3/64 of an inch or so. The top plate 22 rests upon the rubber rings 28 and is therefore spaced from the bottom sheet sufficiently to prevent electrical contact therebetween.

Around their aligned peripheral edges, plates 22 and 24 are separated by a strip 30 of cotton webbing. This webbing, as shown, is approximately 3/64 of an inch thick so as to maintain the plate spacing, and has a width of about 3/8 of an inch or so. This element 30 may be manufactured of any of several materials which will suggest themselves; the important consideration being that it be porous or bibulous and have considerable capillary attraction for the polyvinyl or similar material when this material is in the liquid state. It should also have sufficient resistance to compression and extrusion so as to maintain its thickness dimension reasonably well under the pressure conditions prevailing during the molding operation.

The edges of the plates are enclosed and the external faces near the edges embraced by a U-shaped strip of extruded vinyl plastic material indicated at 32. This channel strip extends entirely around the periphery of the plates so that substantially no portion of the plate edges is exposed.

The mat may be manufactured or assembled as follows: The bottom plate 24, with its electric lead 15 riveted thereto in the usual fashion, is set upon an approximately level surface and the resilient rings 28 located so that one of these is in each of the depressions 26. To facilitate handling, these rings may be lightly secured in position by cementing. Thereafter the strip of webbing 30 is secured by any suitable adhesive to the upper surface of the plate 24, with the outer edge of the webbing approximately flush with the edge of the plate. The top plate 22, with its lead 15 secured thereto, is then put into position, and the extruded vinyl channel strip 32 is pressed over the edges of the plates all the way around so as to secure the assembly together so that it can be handled as a unit.

The mold, which may be conventional, is then opened, and a plurality of polyvinyl blocks—one of which is shown at 34 in FIG. 4—are located in the bottom of the mold. These blocks have a height equivalent to the distance between the bottom of the plate 24 and the bottom of the mat. Their purpose is to support the previously described plate assembly in position centered with respect to the top and bottom of the mold so as to permit the liquid vinyl material to flow underneath the plate 24 to form the mat bottom member 18.

The mold is then closed in the usual fashion, and the fluid polyvinyl material injected so as to fill all the space within the mold cavity.

The liquid polyvinyl material will act partially to soften the blocks 34 and incorporate them in the fluid mass sufficiently so that they become an integral part thereof. Since they do not have time to soften all the way through, however, they maintain the spacing of the plate 24 above the bottom surface of the mat during setting of the molded article. In addition to filling the mold space, the liquid polyvinyl material also softens the channel strip 32 somewhat so as to incorporate this in the fluid mass, and some of the liquid material will leak between the external faces of the plates 22 and 24 and the overlying arms of the channel member 32 and will tend to flow between the plates 22 and 24 at their edges. This liquid material is, however, absorbed by the webbing 30 with the result that a considerable portion of this webbing toward the peripheral edges of the plates becomes saturated with the vinyl material and therefore bonds the plates and webbing firmly together. The vinyl material, however, does not soak all the way through the webbing at any point so as to flow beyond the inner edge thereof. Instead, any excess vinyl material, due to a comparatively large order of leakage at some particular spot, will spread longitudinally because of the capillary attraction of the fibrous mass at 30.

Thus, the top and bottom resilient portions 16 and 18 of the mat, together with the edge and end portions 20, are formed as one unitary casting, with the electrical leads embedded and sealed therein, and the support blocks 34 and channel members 32 are incorporated as a portion of the cast material. Furthermore, the cast material also saturates portions of the fibrous mass 30. The result is that the plates 22 and 24 are completely enclosed and bonded both to the top and bottom resilient members 16 and 18 as well as to each other around their edges. The metal edges therefore cannot work or shift slightly so as to cut the mat material. The mat therefore is completely waterproof and has a greater life in service than other mats of this general character with which I am familiar. Also, as pointed out previously, rejections because of defective mats are cut to a minimum.

The arrangement of FIG. 5 shows a somewhat simpler construction in that it is not necessary to shape the lower sheet 24 so as to form the depressions or pockets 26. In FIG. 5 both of the sheets 22 and 24' are flat and are spaced apart by rubber rings or buttons 28' which differ from the rings 28 in that they are somewhat thinner. Theoretically, a mat as thus constructed might be considered to be insensitive if, in stepping upon the mat, all of the weight were centered over one of the buttons 28'. However, the flexibility of the upper surface portion 16 is sufficient so that as a practical result some portion of the plates 22 and 24' will be brought together in the immediate vicinity of the button 28'. In general, the construction illustrated in FIG. 5 is less expensive and has proved to be satisfactory in service. The construction of FIG. 3, although it involves an additional operation, is preferred, principally because the rings 28 are never compressed to less than approximately half of their height, and therefore the service life of the mat of FIG. 3 is somewhat greater than that of the mat illustrated in FIG. 5.

In the above description of a preferred embodiment of the invention certain dimensions and specific materials have been recited in the interest of clarity of understanding. It will be understood, however, that alterations and substitutions can be made without departing from the scope or spirit of the invention, and that the scope of the invention is to be measured by the scope of the following claims.

Having described my invention, what I claim as new and useful and desire to secure by Letters Patent of the United States is:

1. The process of making pedestrian weight-operated mat switches of the type in which a pair of large area switch plates are spaced apart and encapsulated within a plastic substance which has a resilient elastomer state which adheres to metal surfaces when cured and a liquid state prior to curing; which comprises stacking a pair of aligned flexible metal plates of substantially identical size and shape spaced slightly apart at their edges all the way around the peripheries of said plates by an intervening narrow barrier strip; said barrier strip being resistant to compression and extrusion and formed of a pliable, bibulous, electrically insulating material which has a high degree of absorbency for the liquid plastic substance, and which is substantially unaffected by the liquid plastic substance or the curing step for said plastic substance; forming a subassembly by lightly clamping the plate edges against the intervening barrier strip by pressing a channel strip over the edges of said plates so as to enclose and partially seal the plate edges to provide limited liquid access to the barrier strip external edge, supporting said subassembly in a mold cavity providing clearance around said subassembly, filling said cavity with the plastic substance in the liquid state so as to submerge the plates and channel strip within the liquid plastic mass, a minor portion of the liquid plastic substance in the mold seeping through the partial seal between the channel strip and the plate edges and being absorbed by the bibulous barrier strip, and subsequently curing all of the liquid plastic substance together to the resilient state, the absorbed plastic material after curing acting to bond the plates to each other and to the barrier strip, whereby in the cured assembly the plates are spaced apart and secured together at and near their edges by the plastic substance reinforced by the barrier strip substance and the plates are completely enclosed within the mass of plastic substance in the resilient elastomer state.

2. The method called for in claim 1 in which the barrier strip has substantially the characteristics of cotton webbing.

3. The method called for in claim 1 in which the channel strip is formed of substantially the same material as the resilient encapsulating plastic substance.

References Cited in the file of this patent

UNITED STATES PATENTS

| | | |
|---|---|---|
| 2,251,351 | Cooper | Aug. 5, 1941 |
| 2,346,640 | Anthony | Apr. 18, 1944 |
| 2,466,586 | Evans | Apr. 5, 1949 |
| 2,604,661 | Karns | July 29, 1952 |
| 2,940,127 | Schils | June 14, 1960 |

FOREIGN PATENTS

| | | |
|---|---|---|
| 657,821 | Great Britain | Sept. 26, 1951 |